(12) United States Patent
Kadambi et al.

(10) Patent No.: US 11,181,623 B2
(45) Date of Patent: Nov. 23, 2021

(54) METHODS AND APPARATUS FOR GIGAHERTZ TIME-OF-FLIGHT IMAGING

(71) Applicant: Massachusetts Institute of Technology, Cambridge, MA (US)

(72) Inventors: Achuta Kadambi, Los Angeles, CA (US); Tomohiro Maeda, Brookline, MA (US); Ayush Bhandari, Cambridge, MA (US); Barmak Heshmat Dehkordi, San Mateo, CA (US); Ramesh Raskar, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 651 days.

(21) Appl. No.: 16/147,870

(22) Filed: Sep. 30, 2018

(65) Prior Publication Data

US 2019/0101631 A1  Apr. 4, 2019

Related U.S. Application Data

(60) Provisional application No. 62/566,429, filed on Sep. 30, 2017.

(51) Int. Cl.
*G01S 7/00* (2006.01)
*G01S 7/4912* (2020.01)
(Continued)

(52) U.S. Cl.
CPC ........... *G01S 7/4918* (2013.01); *G01S 7/4811* (2013.01); *G01S 17/36* (2013.01); *G01S 17/894* (2020.01);
(Continued)

(58) Field of Classification Search
USPC ........................................................ 356/5.01
See application file for complete search history.

(56) References Cited

U.S. PATENT DOCUMENTS 4,818,100 A    4/1989  Breen
9,451,141 B2   9/2016  Kadambi et al.
(Continued)

OTHER PUBLICATIONS

Dandliker, R., et al., Two-wavelength laser interferometry using superheterodyne detection; published in Optics Letters, vol. 13, Issue 5, pp. 339-341 (1988).

(Continued)

*Primary Examiner* — James R Hulka
(74) *Attorney, Agent, or Firm* — Daly, Crowley, Mofford & Durkee, LLP

(57) ABSTRACT

A time-of-flight imaging system may output light with a modulation frequency in the gigahertz band, to illuminate a range target. This high-frequency illumination may enable extremely precise—e.g., micron-scale—depth measurements. The system may modulate reflected light from the range target, to create a beat tone that has a frequency in the hertz band. In some cases, the modulated light in the gigahertz band is created by a first modulator and the beat tone in the hertz band is created by a second modulator. In some cases, the modulated light in the gigahertz band is created by an upshift cascade of modulators and the beat tone in the hertz band is created by a downshift cascade of modulators. A photodetector may measure the low-frequency beat tone. From this beat tone, phase of the signal and depth of the range target may be extracted.

20 Claims, 5 Drawing Sheets

(51) Int. Cl.
  *G02F 1/03* (2006.01)
  *G01S 7/481* (2006.01)
  *G02F 1/21* (2006.01)
  *G01S 17/36* (2006.01)
  *G01S 17/894* (2020.01)

(52) U.S. Cl.
  CPC .................. *G02F 1/03* (2013.01); *G02F 1/21* (2013.01); *G02F 1/212* (2021.01)

(56) References Cited

U.S. PATENT DOCUMENTS

| | | | |
|---|---|---|---|
| 9,905,999 B2 | 2/2018 | Li et al. | |
| 2006/0227316 A1* | 10/2006 | Gatt | G01S 7/4811 356/5.09 |
| 2010/0265491 A1* | 10/2010 | McDonald | G01S 17/10 356/5.09 |
| 2010/0290025 A1* | 11/2010 | Parker | G02B 27/0025 356/3 |
| 2012/0033045 A1 | 2/2012 | Schweizer et al. | |
| 2013/0170010 A1* | 7/2013 | Parker | G02B 13/146 359/238 |
| 2016/0377721 A1* | 12/2016 | Lardin | H01S 5/0622 356/5.09 |
| 2018/0180739 A1* | 6/2018 | Droz | G01S 7/487 |
| 2019/0083049 A1* | 3/2019 | Byrnes | A61B 5/0097 |
| 2019/0083059 A1* | 3/2019 | Byrnes | A61B 8/15 |
| 2019/0154810 A1* | 5/2019 | Tanemura | G01S 7/4818 |
| 2020/0371212 A1* | 11/2020 | Rumala | G01S 7/4814 |

OTHER PUBLICATIONS

Dandliker, R., et al., Improvement of speckle statistics in double-wavelength superheterodyne interferometry; published in Applied Optics, vol. 34, Issue 31, p. 7197-7201 (1995).

Gupta, M., et al., Phasor Imaging: A Generalization of Correlation-Based Time-of-Flight Imaging; published in ACM Transactions on Graphics (TOG), vol. 34 Issue 5, Oct. 2015, Article No. 156.

Heide, F., et al., Doppler time-of-flight imaging; published in ACM Transactions on Graphics (TOG), vol. 34 Issue 4, Aug. 2015, Article No. 36.

Kadambi, A., et al., Signal Processing for Time-of-Flight Imaging Sensors: An introduction to inverse problems in computational 3-D imaging; published in : IEEE Signal Processing Magazine, vol. 33, Issue 5, Sep. 2, 2016.

Lange, R., et al., Solid-state time-of-flight range camera; published in IEEE Journal of Quantum Electronics, vol. 37, Issue 3, Mar. 2001.

Li, F., et al., High-depth-resolution range imaging with multiple-wavelength superheterodyne interferometry using 1550-nm lasers; published in Applied Optics, vol. 56, Issue 31, p. H51-H56, Sep. 15, 2017, posted Aug. 23, 2017 Doc. ID 297083.

Tanaka, Y., et al., Precision distance measurement using a two-photon absorption process in a silicon avalanche photodiode with saw-tooth phase modulation; published in Applied Optics, vol. 54, Issue 28, p. E35-E40 (2015).

\* cited by examiner

METHODS AND APPARATUS FOR GIGAHERTZ TIME-OF-FLIGHT IMAGING

RELATED APPLICATIONS

This application claims the benefit of U.S. Provisional Application No. 62/566,429 filed Sep. 30, 2017 (the "Provisional").

FIELD OF TECHNOLOGY

The present invention relates generally to time-of-flight imaging.

BACKGROUND

Conventional time-of-flight (ToF) imagers are a popular method of obtaining depth images of a scene, with a meter-scale depth resolution (e.g. with a depth resolution between 1 meter and 10 meters).

ToF imagers may rely on the relation $$\text{Distance} = \text{Speed} \times \text{ToF}, \quad (1)$$

where (i) distance is distance traveled by light, (ii) speed is speed of light; and (iii) ToF is the amount of time that that it takes for light to travel the distance. Because the speed of light is known ($c = 3 \times 10^8$ meters per second), the distance that light travels (e.g., from a ToF imager to a scene and back) may be estimated from a measurement of time-of-flight, per Equation 1.

Some conventional ToF sensors detect the time-of-flight (or equivalently the distance traveled by light) by measuring the phase of light reflected from the scene. This is because the phase of reflected light incident on the ToF sensor varies as a function of the time-of-flight (or equivalently, as a function of the distance traveled by the light).

The greater the modulation frequency of the light, the better the depth resolution that may be achieved.

Some conventional ToF sensors achieve modulation frequencies in the MHz band. Unfortunately, sensing in the MHz band results in relatively poor depth precision. For instance: (a) a Mesa Swiss Ranger® ToF camera may employ an approximately 30 MHz modulation frequency for sensing; and (b) thus, for the Mesa Swiss Ranger® ToF camera, a change of about 27.8 mm in pathlength causes a 1 degree change in phase (of reflected light incident on the camera). Likewise: (a) a Microsoft® Kinect® may employ an approximately 120 MHz modulation frequency for sensing; and (b) thus, for the Microsoft® Kinect®, a change of about 6.94 mm in pathlength causes a 1 degree change in phase (of reflected light incident on the Kinect®).

Unfortunately, these conventional ToF devices (e.g., Swiss Ranger® camera and Microsoft® Kinect®) are unable to achieve micron scale depth resolution, because their modulation frequencies are too low.

Other conventional ToF sensors perform optical interferometry. For instance, in optical heterodyne detection, two lasers at different optical frequencies may create an interference pattern. Conventional ToF optical interferometers may operate in the terahertz band of optical frequencies. However, conventional ToF optical interferometers suffer from at least three problems: First, they are not robust against external vibrations. Instead, in conventional optical interferometers, external vibrations affect bulk optical paths, causing the conventional interferometer to output inaccurate results. Second, a small percentage drift in laser optical frequency may cause a large change in the interference pattern. For instance, if optical frequency of each of the two lasers varies by one part in one million; at a wavelength of 1550 nm, the optical frequency of each of the two lasers may vary by about 2 MHz, resulting in large changes in the interference pattern. Third, the range of optical frequencies emitted by a laser may be limited, even if the laser is tunable.

SUMMARY

In illustrative implementations, a time-of-flight imaging system outputs light with a modulation frequency in the gigahertz band, to illuminate a range target. This high-frequency illumination may enable extremely precise—e.g., micron-scale—depth measurements. The system may modulate reflected light from the range target, to create a beat tone that has a frequency in the hertz band. In some cases, the modulated light in the gigahertz band is created by a first modulator and the beat tone in the hertz band is created by a second modulator. In some cases, the modulated light in the gigahertz band is created by an upshift cascade of modulators and the beat tone in the hertz band is created by a downshift cascade of modulators. A photodetector may measure the low-frequency beat tone. From this beat tone, phase of the signal and depth of the range target may be extracted.

In illustrative implementations of this invention, a ToF imager illuminates a scene with light that has a modulation frequency in the GHz band.

In illustrative implementations, due to the high modulation frequency, the ToF imager achieves micrometer-scale depth resolution. For example, a prototype of this invention achieves range precision (also called depth resolution) of under 3 microns at a distance of about 2 meters. Sensing in the GHz band achieves a very short "1 degree path" (i.e., the change in pathlength that produces a 1 degree change in phase). For instance, in some implementations of this invention: (a) the ToF imager employs a modulation frequency of 1 GHz; and (b) thus a change in pathlength of about 833 microns produces a 1 degree change in phase (of reflected light incident on the ToF imager). Likewise, in some implementations of this invention: (a) the ToF imager employs a modulation frequency of 10 GHz; and (b) thus a change in pathlength of about 83.3 microns produces a 1 degree change in phase (of reflected light incident on the ToF imager).

In illustrative implementations, this invention avoids the three problems described above, which plague conventional ToF optical interferometers. That is, in illustrative implementations of this invention: (a) the ToF imager is robust against environmental vibration; (b) the ToF sensor is robust against laser drift; and (c) the sensing frequency may be tuned over a very wide range of frequencies.

In illustrative implementations of this invention, a ToF imager employs beat tones. In illustrative implementations, the ToF imager illuminates a scene with light in the GHz band (for greater depth precision) and then senses a beat tone in the Hz range (for easy detection).

In some cases, the ToF imager includes two light modulators. The first modulator may modulate light at a first modulation frequency in the GHz band, to illuminate an object in the scene. Light may reflect from the object and travel back to a second modulator. The second modulator may modulate reflected light at a second modulation frequency that is also in the GHz band but is slightly different than the first modulation frequency. This, in turn, may result in a low-frequency beat tone that is in the Hz band. The frequency of the beat tone may be equal to the difference between the first and second modulation frequencies. The low-frequency beat tone may be detected by a photosensor.

For instance, in some use scenarios: (a) a ToF imager includes a laser diode light source, a first modulator, a second modulator, and a light sensor; (b) light from the laser diode passes through the first modulator; (b) the first modulator modulates the light at a first modulation frequency of 10 GHz; (c) the 10 GHz illumination illuminates a scene and then reflects back to the second modulator; (d) the second modulator modulates the reflected light at a second modulation frequency of 10 GHz plus 10 Hz, thereby creating a beat tone with a frequency of 10 Hz (the magnitude of the difference between the first and second modulation frequencies); and (e) the light sensor detects the beat tone.

In some cases, each of the modulators is a Mach-Zehnder (MZ) modulator that comprises an MZ interferometer with a lithium niobate (LiNbO3) crystal positioned in one arm of the interferometer. As light passes through the crystal, an AC (alternating current) electrical signal may be applied, causing the refractive index of the crystal to oscillate at a GHz frequency. This oscillation of the crystal's refractive index may modulate the optical path length in the interferometer arm in which the crystal is located.

In this two-modulator approach, the maximum illumination frequency that is achievable may be equal to the maximum oscillation frequency of the crystal. For instance, the highest oscillation frequency of a lithium niobate crystal may be approximately 100 GHz.

In some implementations of this invention, the ToF imager achieves illumination modulation frequencies that are much greater than the maximum oscillation frequency of a crystal. The ToF imager may do so by cascading the modulators.

In some implementations, what we call a "cascaded time-of-flight" (or "cascaded ToF") approach is employed. In this cascaded ToF approach, the modulation frequency of light illuminating the scene is boosted to more than 100 GHz (but still in the GHz band). This is done by passing the light through a cascade of modulators.

In the cascaded ToF approach, in some cases, each modulator is a Mach-Zehnder (MZ) modulator that comprises an MZ interferometer with a lithium niobate crystal positioned in one arm of the interferometer. Again, as light passes through the crystal, an AC electrical signal may be applied, causing the refractive index of the crystal to oscillate at a GHz frequency. Again, this oscillation of the crystal's refractive index may modulate the optical path length in the interferometer arm in which the crystal is located.

In the cascaded ToF approach, an "upshift" cascade of modulators produces illumination for the scene. This upshift cascade may sequentially boost modulation frequency as light passes through it. The high-frequency illumination that exits the up-shift cascade may include multiple beat tones. For instance, if the "up-shift" cascade comprises three modulators, and if the crystal oscillation rates in the first, second and third modulator are $\Omega_1$, $\Omega_2$ and $\Omega_3$, respectively, then four beat tones may be included in light exiting the "up-shift cascade", specifically: (a) a first beat tone equal to $\Omega_1+\Omega_2+\Omega_3$; (b) a second beat tone equal to $\Omega_1+\Omega_2-\Omega_3$; (c) a third beat tone equal to $\Omega_1-\Omega_2+\Omega_3$; and (d) a fourth beat tone equal to $\Omega_1-\Omega_2-\Omega_3$.

Each "beat tone" herein may comprise a light signal that has a beat frequency and that is caused by interference between a first light signal at a first modulation frequency and a second light signal at a second modulation frequency. The beat frequency may be equal to either: (a) the magnitude of the difference between the first and second modulation frequencies; or (b) the magnitude of the sum of the first and second modulation frequencies. In the first sentence of this paragraph, the first and second light signals may themselves be beat tones.

In illustrative implementations of this invention: (a) the modulators (e.g., MZ modulators) modulate the amplitude of light; and (b) modulation frequency is frequency at which amplitude of light is modulated.

In the cascaded ToF approach, in some cases, the scene is illuminated by all of the beat tones exiting the upshift cascade, but only the highest frequency bet tone is employed for depth sensing. For instance, in the three modulator example above: (a) the highest frequency beat tone that exits the upshift cascade is $\Omega_1+\Omega_2+\Omega_3$; and (b) this highest frequency beat tone may be employed for depth sensing.

We sometimes call the highest-frequency beat tone that exits the upshift cascade the "illumination probe".

In the cascaded ToF approach, light (including the illumination probe) may exit the upshift cascade of the ToF imager, then travel to a range target, then reflect from the range target, and then travel back to a "downshift" cascade of modulators in the ToF imager.

In the cascaded ToF approach, the downshift cascade may sequentially reduce modulation frequency of the reflected light, as the reflected light passes through the downshift cascade. The downshift cascade may produce multiple beat tones. The lowest frequency beat tone that exits the downshift cascade and that is derived from the illumination probe (i.e., derived from the highest frequency beat tone that illuminates the scene) may be detected by the photosensor.

We sometimes call this lowest frequency beat tone (that exits the downshift cascade and is derived from the illumination probe) the "downshifted signal". The downshifted signal may have a frequency in the hertz band and may comprise an intermediate signal (as that term is used in the field of heterodyning).

In some cases, light exiting the downshift cascade is low-pass filtered to eliminate higher frequency beat tones before they reach the photosensor. In other cases, the photosensor's limited frequency range causes the photosensor to detect the downshifted tone and to ignore the higher frequency beat tones that exit the downshift cascade.

In some implementations, the depth of an object in the scene (a range target) is estimated, based on phase of the downshifted signal. The estimated depth may be the distance between the ToF imager and the range target. Alternatively, the roundtrip pathlength (which is twice the depth) is determined from phase of the downshifted signal.

In some cases, phase of the downshifted signal is extracted by employing a standard ToF correlation approach. For instance, the ToF imager may include a sensor that comprises one or more lock-in pixels. Each lock-in pixel may measure a correlation between a reference signal and the downshifted signal incident at that pixel. Based on the correlation, the phase of the downshifted signal at that pixel may be determined. For instance, in some cases, the so-called "four-bucket" sampling method may be employed to calculate phase and pathlength for a given lock-in pixel, based on correlation measured by the lock-in pixel.

Alternatively, the downshifted signal may be directly sampled (instead of measuring correlation with a reference signal) and phase may be extracted from the samples. In some cases, a 3-point DFT (discrete Fourier transform), or a n-point DFT, or non-linear curvefitting, may be employed to detect phase. In some cases, phase is calculated by a method that includes identifying zero crossings. In some implementations, direct sampling of the downshifted signal is facilitated by the low frequency of the downshifted signal (e.g., less than 30 Hz, or less than 20 Hz, or less than 10 Hz).

In illustrative implementations, a ToF imager detects depth of a range target with extreme accuracy over a wide range of distances (e.g., 10 centimeters to 1000 meters). The hardware employed in a particular implementation may depend on the distance at which the ToF sensor may operate. At greater distances, it is desirable to employ more powerful lasers. For instance, at a depth of 1000 meters, a powerful laser and multiple EDFAs (erbium doped fiber amplifiers) may be employed.

In illustrative implementations, the modulation frequency used for depth detection is greater than or equal to 1 GHz and less than or equal to 999 GHz. In some cases, with only two modulators that each include a lithium niobate crystal, the modulation frequency that illuminates the scene and that is used for depth detection has a frequency that is greater than or equal to 1 GHz and less than or equal to 100 GHz. In some cases, in a cascaded ToF approach, the modulation frequency that illuminates the scene and that is used for depth detection has a frequency that is greater than 100 GHz and less than or equal to 999 GHz.

In illustrative implementations, the downshifted signal has a frequency that is greater than or equal to 1 hertz and less than 1 kilohertz. For instance, in some cases, the downshifted frequency is 10 Hz. In some cases, the downshifted signal has a video frame frequency, such as 24 Hz, 25 Hz, 29.97 Hz, 30 Hz, 50 Hz, 59.94 Hz or 60 Hz.

This invention is not limited to Mach-Zehnder interferometers. Alternatively, other types of interferometers may be employed, such as Michelson, Fizau, Twyman-Green or Sagnac interferometers.

This invention is not limited to lithium niobate crystals. Alternatively, other types of electro-optic (EO) modulators may be employed, such as a Pockels cell, LCD (liquid crystal display) panel or polarized EO modulator.

This invention has many practical applications. For instance, in illustrative implementations, the ToF imager performs range imaging at GHz frequencies, and thus may be employed for high-quality 3D scans of an object at micron-scale, as well as for precise bioimaging, machine vision, computer vision and graphics, and for high spatial resolution imaging of NLOS (non-line-of-sight) objects.

Furthermore, in illustrative implementations, this invention achieves GHz resolution in ToF measurements at detection frequencies of a few hertz. In some implementations, this in turn enables: (a) a video camera to perform high-resolution LIDAR (light detection and ranging) imaging; or (b) an ordinary DSLR (digital single-lens reflex) camera to perform fast LIDAR imaging.

In some implementations, the ToF imager has only a single pixel. Alternatively, the ToF imager may comprise a wide-field imager with multiple pixels. For instance, the wide-field imager may comprise a cascaded stack of microchannels plates that are configured to acquire high-frequency range information.

In some implementations, the modulators perform polarization modulation, instead of modulation of amplitude of light.

The Summary and Abstract sections and the title of this document: (a) do not limit this invention; (b) are intended only to give a general introduction to some illustrative implementations of this invention; (c) do not describe all of the details of this invention; and (d) merely describe non-limiting examples of this invention. This invention may be implemented in many other ways. Likewise, the Field of Technology section is not limiting; instead it identifies, in a general, non-exclusive manner, a field of technology to which some implementations of this invention generally relate.

The above Figures are not necessarily drawn to scale. The above Figures show some illustrative implementations of this invention, or provide information that relates to those implementations. The examples shown in the above Figures do not limit this invention. This invention may be implemented in many other ways.

DETAILED DESCRIPTION

Higher Frequency for Greater Depth Precision

In illustrative implementations of this invention, a ToF imager achieves much greater depth precision than do conventional ToF range finders such as a Microsoft® Kinect® v2. In illustrative implementations, the ToF imager achieves this greater depth precision by employing a much higher frequency than does the Microsoft® Kinect® v2. For instance, in illustrative implementations, a ToF imager employs a modulation frequency in the GHz band, as compared to a roughly 120 MHz modulation frequency employed by a Microsoft® Kinect® v2.

In some implementations, depth of a range target is determined from phase. In some implementations, the greater the modulation frequency, the more precise the phase measurement.

Increasing the modulation frequency of phase ToF cameras may offer greater depth precision. The range accuracy $\Delta L$ (i.e., the minimum increment of depth that is resolvable by the ToF camera) may be inversely proportional to the modulation frequency, as follows $$\Delta L \propto \frac{c}{\Omega}, \qquad (2)$$

where c is the speed of light and $\Omega$ is modulation frequency.

The relationship between modulation frequency and accuracy of phase detection (and thus of distance detection) may be illustrated by the "1 degree path".

As used herein, "1 degree path" means the change in pathlength that causes a phase shift of one degree in the measured signal. Expressed symbolically, $$z_{1^\circ} = \frac{c\pi}{180\Omega}, \qquad (3)$$

where $z_1^\circ$ is the "1 degree path" and $\pi$ is Archimedes' constant.

The 1 degree path $z_1°$ decreases as modulation frequency increases. For instance: (a) at 30 MHz, the 1 degree path $z_1°$ is 27.8 mm; (b) at 120 MHz, the 1 degree path $z_1°$ is 6.94 mm; (c) at 1 GHz, the 1 degree path $z_1°$ is 833 microns; and (d) at 10 GHz, the 1 degree path $z_1°$ is 83.3 microns. 30 MHz is approximately equal to a modulation frequency employed by a Mesa Swiss Ranger® time-of-flight camera; 120 MHz is approximately equal to a modulation frequency employed by a Microsoft® Kinect® time-of-flight camera; and (c) 1 GHz and 10 GHz are examples of modulation frequencies that may be employed for range detection in illustrative implementations of this invention.

Figure 1:
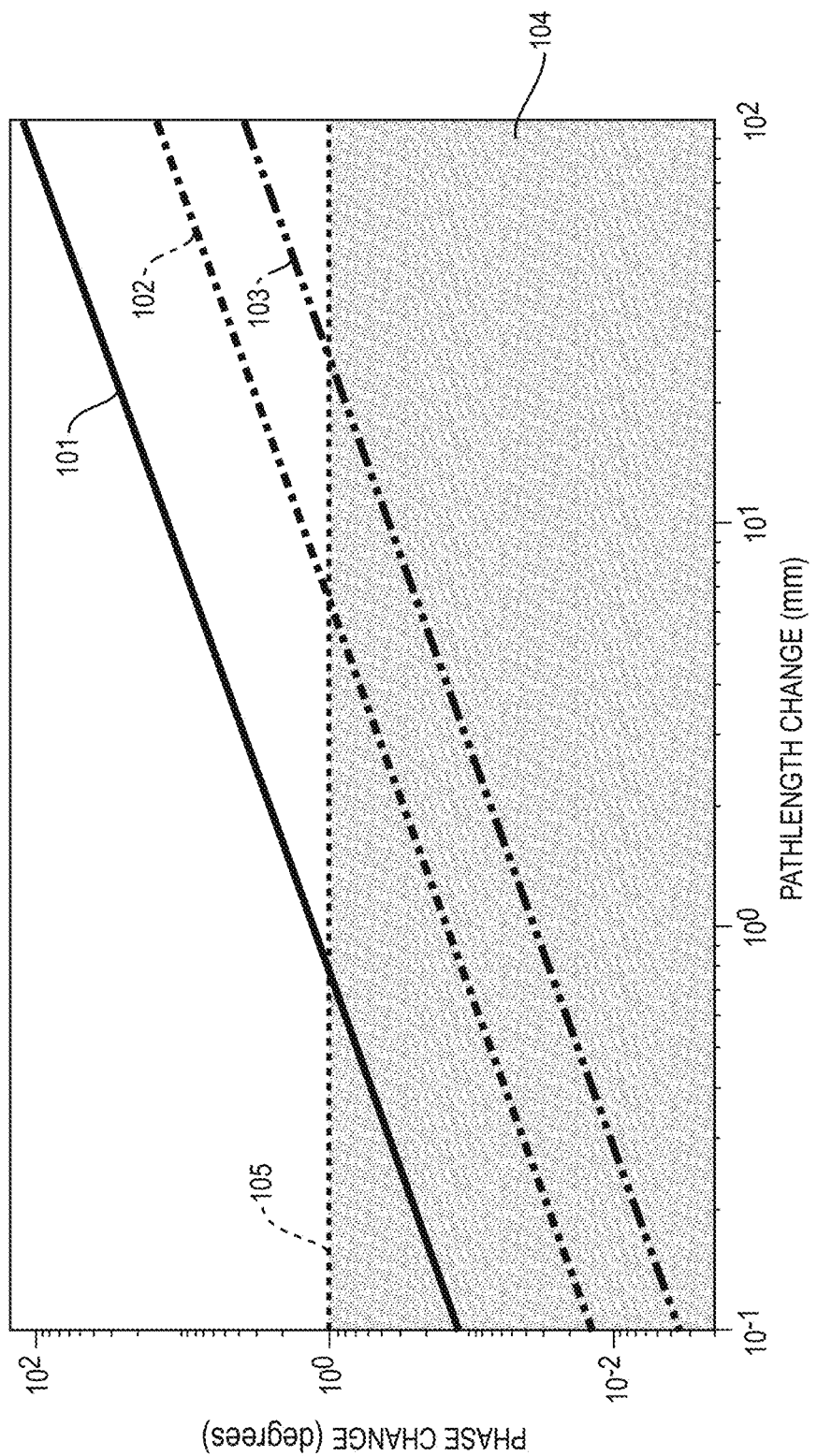
FIG. 1 is a chart that shows that phase change as a function of pathlength change.

In illustrative implementations, phase accuracy depends on both frequency and pathlength. FIG. 1 is a logarithmic chart that plots phase change (in degrees) as a function of pathlength change (in millimeters) for three different modulation frequencies: (a) 1 GHz (line 101); (b) 120 MHz (line 102); and (c) 30 MHz (line 103). The horizontal coordinate of the intersection of line 105 and the line for the 1 GHz modulation frequency 101 describes the pathlength change that causes a 1 degree phase change in a 1 GHz signal. Likewise, the horizontal coordinate of the intersection of line 105 and the line for the 120 MHz modulation frequency 102 describes the pathlength change that causes a 1 degree phase change in a 120 MHz signal. Similarly, the horizontal coordinate of the intersection of line 105 and the line for the 30 MHz modulation frequency 103 describes the pathlength change that causes a 1 degree phase change in a 30 MHz signal. In FIG. 1, phase change is less than 1 degrees in shaded region 104.

As can be seen from FIG. 1, in illustrative implementations, the greater the modulation frequency, the shorter the change in pathlength needed to produce a 1 degree change in phase.

Illuminating in GHz Band; Detecting Beat Tone in Hz Band

In some implementations, a two-modulator configuration is employed: (a) to boost modulation frequency to the GHz band to illuminate a range target; and (b) then to modulate reflected light from the range target to create a low-frequency beat tone that is detected by a photosensor.

Figure 2A:
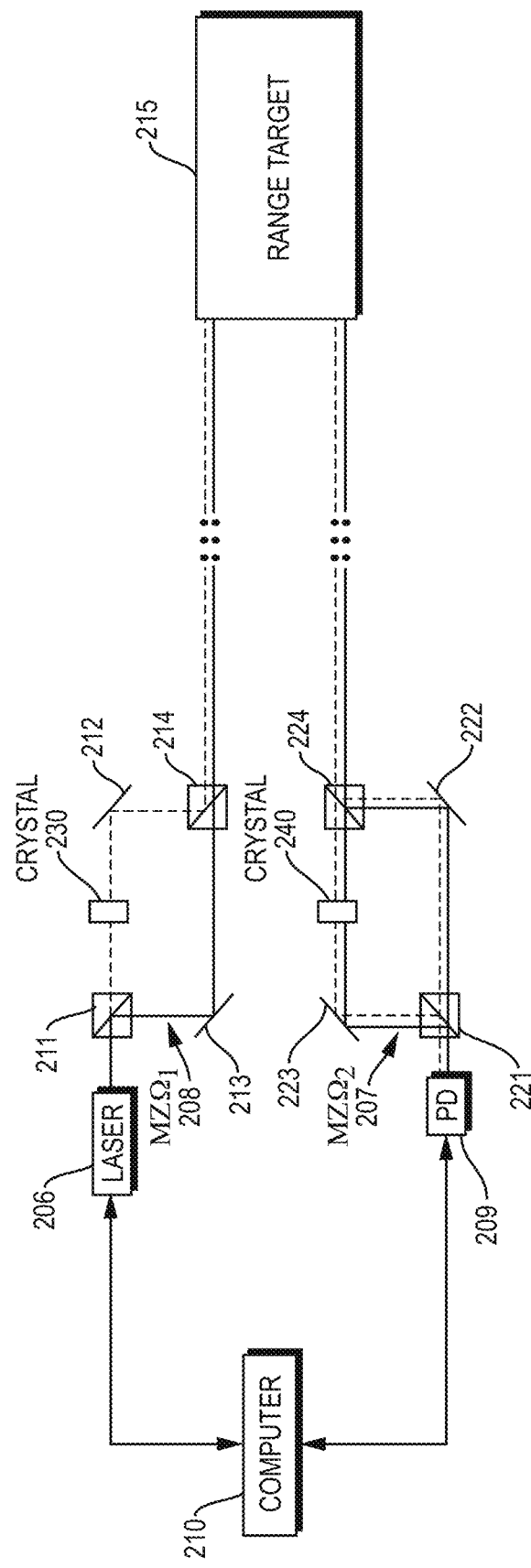
FIG. 2A shows a "two-modulator" hardware configuration.

FIG. 2A shows an example of a "two-modulator" hardware configuration. In FIG. 2A, a laser 206 (e.g., a laser diode) emits light. The light travels to a first Mach-Zehnder (MZ) modulator 208 (labeled MZ$\Omega_1$ in FIG. 2A). The first MZ modulator 208 modulates the light at modulation frequency $\Omega_1$ which is in the GHz band.

Figure 3:
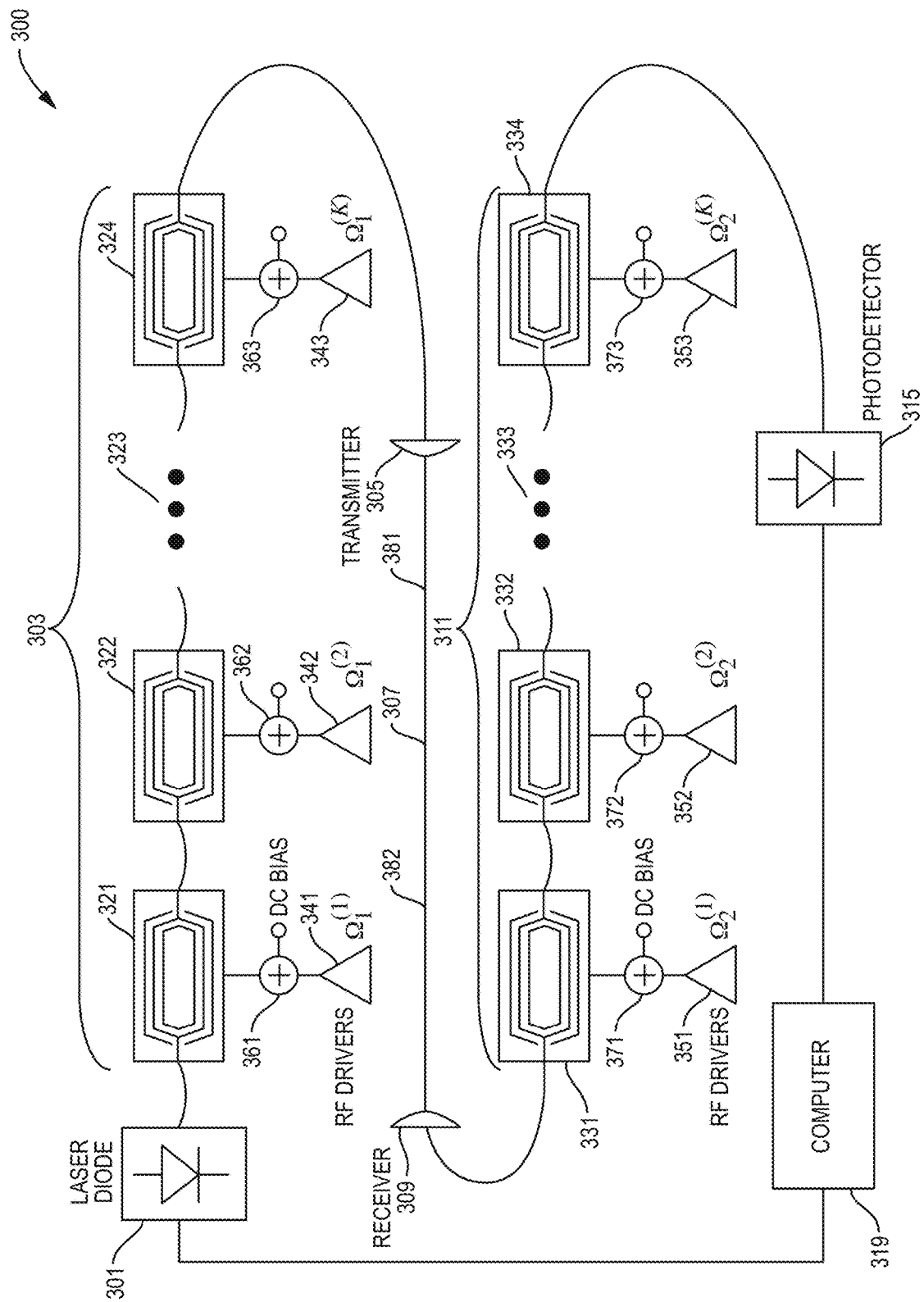
FIG. 3 shows "cascaded ToF" hardware.

In FIG. 2A, light at modulation frequency $\Omega_1$ travels from the first MZ modulator 208 to a range target 215, then reflects from range target 215, and then travels to a second MZ modulator 207. In FIGS. 2A and 3, the range target (e.g., 215 or 307) is an object in the scene, whose distance from the ToF imager is being measured. For instance, in some use scenarios, range target 215 or 307 is a car, an object in a car's environment, a wall, a piece of furniture, an object in a factory or warehouse, an industrial product, a human face, tissue, or an entire human body.

In FIG. 2A, the second MZ modulator 207 modulates the light at modulation frequency $\Omega_2$ which is also in the GHz band. This in turn produces a beat tone, which has a frequency of $\Omega_2-\Omega_1$. In FIG. 2A, the frequency of the beat tone is in the hertz band (e.g., less than or equal to 30 Hz, or less than or equal to 20 Hz, or less than or equal to 10 Hz). For instance, in some use scenarios, $\Omega_1$ is 10 GHz, $\Omega_2$ is 10 GHz plus 10 Hz, and the frequency of the beat tone ($\Omega_2-\Omega_1$) is 10 Hz.

In FIG. 2A, the low-frequency beat tone is detected by photodetector 209. In some cases, photosensor 209 comprises a video frame imaging sensor.

Thus, in the "two-modulator" approach shown in FIG. 2A: (a) the range target is illuminated with light in the GHz band thereby enabling high precision depth measurements; and (b) a low-frequency beat tone in the Hz band is detected by the photosensor.

In FIGS. 2A and 3, each modulator (e.g., 207, 208, 321, 322, 324, 331, 332, 334) is a Mach-Zehnder modulator that comprises a Mach-Zehnder interferometer and a lithium niobate crystal. Each Mach-Zehnder interferometer may have two "arms". In the first arm, light may travel from a beam splitter (e.g., 211 or 221) to a mirror (e.g., 213 or 223) and then to a beam splitter (e.g., 214 or 224). In the second arm, light may travel from a beam splitter (e.g., 211 or 221) to the lithium niobate crystal (e.g., 230 or 240), then pass through the crystal, then travel to a mirror (e.g., 212 or 222) and then travel to a beam splitter (e.g., 214 or 224). In the second arm, light is modulated at a modulation frequency (e.g., $\Omega_1$ or $\Omega_2$ in FIG. 2A, or $\Omega_1^{(1)}$, $\Omega_1^{(2)}$, $\Omega_1^{(K)}$, $\Omega_2^{(1)}$, $\Omega_2^{(2)}$, or $\Omega_2^{(K)}$ in FIG. 3). The modulation frequency may be in the GHz band.

In each Mach-Zehnder (MZ) modulator in FIGS. 2A and 3, the modulation of light in the second arm may be achieved by passing the light through a lithium niobate crystal while the refractive index of the crystal oscillates in response to an alternating electrical current. Changes in the refractive index of the crystal may alter the optical path length of the second arm, and thus create a time-varying phase difference between the phase of light in the second arm and the phase of light in the first arm. This time-varying phase difference may cause a time-varying amplitude difference in the output of the MZ modulator.

Figure 2B:
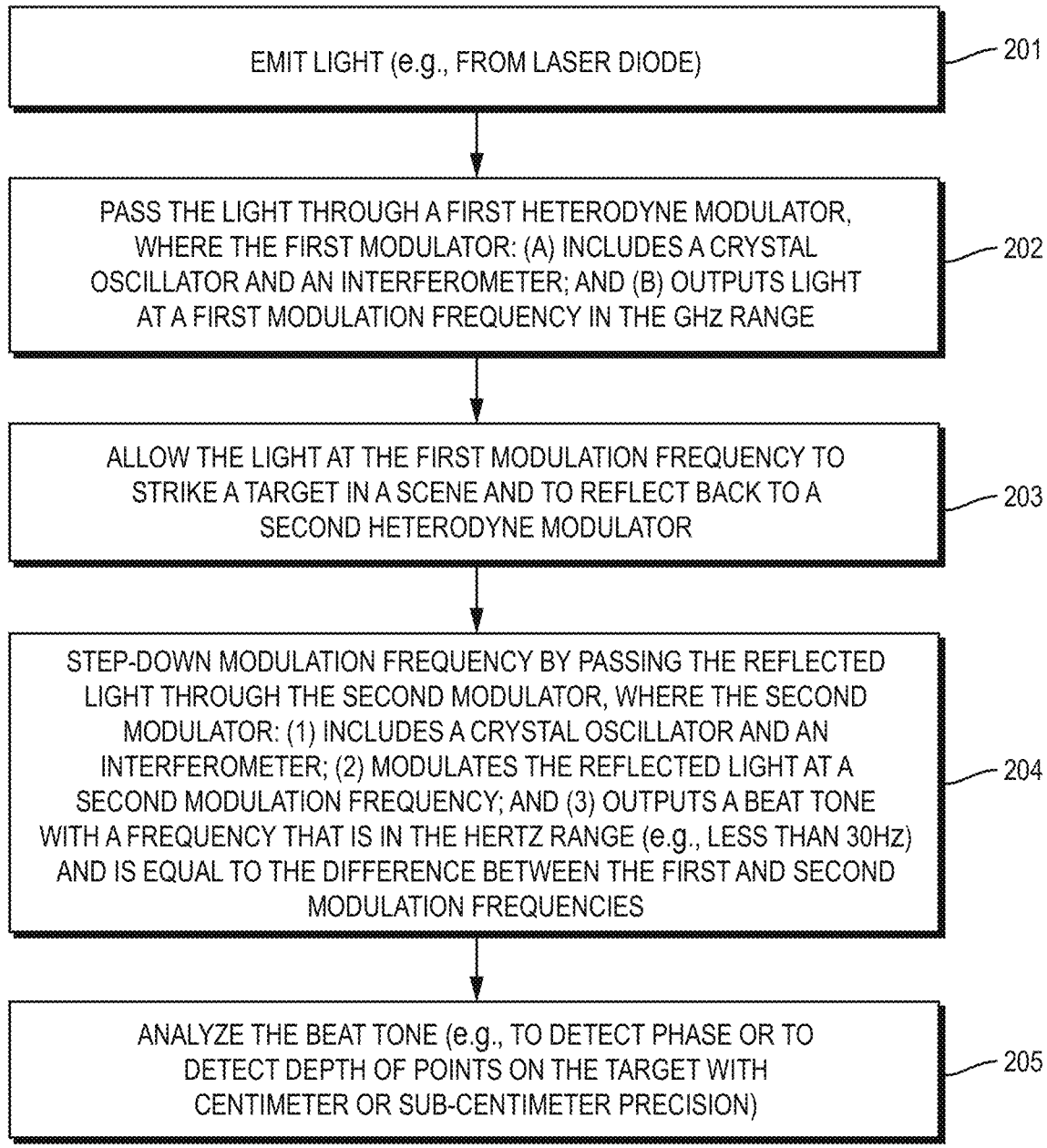
FIG. 2B is a flowchart for a "two-modulator" method of depth detection.

FIG. 2B is a flowchart for a "two-modulator" method of depth detection with GHz band illumination. In the example shown in FIG. 2B, the method includes at least the following steps: Emit light (e.g., from laser diode) (Step 201). Pass the light through a first heterodyne modulator, where the first modulator: (a) includes a crystal oscillator and an interferometer; and (b) outputs light at a first modulation frequency in the GHz band (Step 202). Allow the light at the first modulation frequency to strike a target in a scene and to reflect back to a second heterodyne modulator (Step 203). Step-down modulation frequency by passing the reflected light through the second modulator, where the second modulator: (1) includes a crystal oscillator and an interferometer; (2) modulates the reflected light at a second modulation frequency; and (3) outputs a beat tone with a frequency that is in the hertz band (e.g., less than 30 Hz) and is equal to the difference between the first and second modulation frequencies (Step 204). Analyze the beat tone (e.g., to detect phase or to detect depth of points on the target with centimeter or sub-centimeter precision) (Step 205).

In some implementations, a "cascaded time-of-flight" configuration is employed: (a) to boost modulation frequency to the GHz band to illuminate a range target; and (b) then to modulate reflected light from the range target to create a low-frequency beat tone that is detected by a photosensor.

In some cases, using a "cascaded ToF" configuration enables the illumination frequency to be boosted much higher than in a "two-modulator" configuration.

FIG. 3 shows an example of a "cascaded ToF" imager 300. In FIG. 3, a laser diode 301 emits light. The light then passes through an "upshift" cascade 303 of Mach-Zehnder (MZ) modulators. The light may be modulated as it passes through upshift cascade 303. Light exiting the upshift modulator 303 may include multiple beat tones.

In some cases, the highest frequency beat tone exiting the upshift modulator has a frequency that is equal to the sum of the modulation frequencies of the MZ modulators in the upshift cascade. For instance, if upshift cascade 303 comprises three MZ modulators with modulation frequencies of $\Omega_1^{(1)}$, $\Omega_1^{(2)}$, $\Omega_1^{(3)}$, respectively, then the highest frequency beat tone exiting upshift cascade 303 may have a frequency of $\Omega_1^{(1)}+\Omega_1^{(2)}+\Omega_1^{(3)}$.

We sometimes call this highest frequency beat tone (that exits the upshift cascade) the "illumination probe".

Thus, in FIG. 3, MZ modulators in upshift cascade 303 may together create a modulation frequency that is much higher than the modulation frequency which than any single MZ modulator in the cascade is able to produce. For instance, in some cases: (a) each crystal in the cascade is a lithium niobate crystal that has a maximum oscillation frequency of approximately 100 GHz; (b) thus, the maximum modulation frequency produced by a single MZ modulator is approximately 100 GHz; and (c) the upshift cascade as a whole may produce multiple beat tones in such a way that the highest frequency beat tone has a modulation frequency that is between 100 GHz and 999 GHz.

In FIG. 3, upshift cascade 303 may comprise two, three, four, five, six or more MZ modulators. In FIG. 3, upshift cascade 303 is represented by MZ modulators 321, 322, 324. Three dots 323 indicate that upshift cascade 303 may also include other MZ modulators.

In FIG. 3, the illumination probe (i.e., the highest frequency beat tone produced by the upshift cascade) may travel from upshift cascade 303 to a transmitter 305, then travel to range target 307, then reflect from range target 307, then travel to a receiver 309, and then travel to "downshift" cascade 311 of MZ modulators.

In FIG. 3, downshift cascade 311 may comprise two, three, four, five, six or more MZ modulators. In FIG. 3, downshift cascade 311 is represented by MZ modulators 331, 332, 334. Three dots 333 indicate that downshift cascade 311 may also include other MZ modulators.

For ease of illustration, in FIG. 3, light paths to and from the range target are shown as being along the same straight line. However, in many implementations, these light paths, taken as a whole, are folded because light travels from the ToF imager to the range target and then back to the ToF imager. For instance, in some cases: (a) transmitter 305 and receiver 309 are located close to each other; and (b) light travels from the transmitter to the range target via light path 381, reflects from the range target, and then travels back from the range target to the receiver via light path 382, in such a way that (i) light paths 381 and 382 are almost co-located and (ii) the direction of travel along the latter is approximately the reverse of the direction of travel along the former.

In FIG. 3, the reflected illumination probe is incident on downshift cascade 311. Light from the illumination probe passes through, and is modulated by, downshift cascade 311. Light exiting downshift cascade 311 may comprise multiple beat tones.

In FIG. 3, the lowest frequency beat tone that exits downshift cascade 311 and that corresponds to the illumination probe may have a frequency that is equal to the modulation frequency of the illumination probe minus the sum of the modulation frequencies of the MZ modulators in the downshift cascade.

For instance, consider an example in which: (a) upshift cascade 303 comprises three MZ modulators with modulation frequencies of $\Omega_1^{(1)}$, $\Omega_1^{(2)}$, $\Omega_1^{(3)}$, respectively; (b) the illumination probe (i.e., the highest frequency beat tone exiting upshift cascade 303) has a modulation frequency of $\Omega_1^{(1)}$, $\Omega_1^{(2)}$, $\Omega_1^{(3)}$; and (c) downshift cascade 311 comprises three MZ modulators with modulation frequencies of $\Omega_2^{(1)}$, $\Omega_2^{(2)}$, $\Omega_2^{(3)}$, respectively. In the example described in the preceding sentence, the lowest frequency beat tone that exits downshift cascade 311 and that corresponds to the illumination probe may have a frequency of $\Omega_1^{(1)}+\Omega_1^{(2)}+\Omega_1^{(3)}-\Omega_2^{(1)}-\Omega_2^{(2)}-\Omega_2^{(3)}$. For instance, if $\Omega_1^{(2)}=\Omega_1^{(3)}=\Omega_2^{(1)}=\Omega_2^{(2)}=\Omega_2^{(3)}=80$ GHz and if $\Omega_1^{(1)}$ equals 80 GHz plus 10 Hz, then the lowest frequency beat tone that exits the downshift cascade and that corresponds to the illumination probe may have a frequency of 10 Hz.

We sometimes call the lowest frequency beat tone (that exits the downshift cascade and corresponds to the illumination probe) the "downshifted signal". The downshifted signal may comprise an intermediate signal (in heterodyning terminology).

In illustrative implementations, the downshifted signal has a frequency that is greater than or equal to 1 hertz and less than 1 kilohertz. For instance, in some cases, the downshifted frequency is less than or equal to 30 Hz, or less than or equal to 20 Hz, or less than or equal to 10 Hz. In some cases, the downshifted signal has a video frame frequency, such as 24 Hz, 25 Hz, 29.97 Hz, 30 Hz, 50 Hz, 59.94 Hz or 60 Hz.

In FIG. 3, the downshifted signal (which is a beat tone) is detected by photodetector 315.

Thus, in the cascaded ToF approach shown in FIG. 3: (a) the range target is illuminated with light in the GHz band thereby enabling high precision depth measurements; and (b) a low-frequency beat tone in the Hz band is detected by the photodetector.

In some cases, the photodetector (e.g., 209 or 315) has only one pixel. In other cases, the photodetector (e.g., 209 or 315) comprises multiple pixels.

In some cases, the photodetector (e.g., 209 or 315) comprises one or more lock-in ToF pixels. Each lock-in pixel may calculate a cross-correlation between a reference signal and the downshifted signal incident on that pixel. Based on this cross-correlation, a computer (e.g., 319 or 210): (a) may calculate phase of the downshifted signal for that pixel; (b) may calculate depth of a range target (e.g., if the photodetector is single-pixel); or (c) may calculate depth of a region of the range target that corresponds to that pixel (e.g., if the photodetector is multi-pixel). In some cases, each lock-in pixel includes a lock-in amplifier. In some cases, a reference signal that is employed for the cross-correlation may be (or may be calculated based on) one or more of the AC electrical signals that drive the MZ modulators. For example, an electronic mixer may take, as input, one or more of the AC electrical signals that drive the MZ modulators and may output the reference signal. In some cases, any noises or jitters in an AC signal going to a MZ modulator may manifest in output from an electronic mixer (which may be desirable when performing correlation ToF depth detection).

In some cases: (a) the photodetector (e.g., 209 or 315) comprises multiple pixels; and (b) a separate downshift cascade is employed for each pixel. For instance, the downshift cascades for a multi-pixel photodetector may be implemented optically or by a stack (or stacks) of microchannel plates.

In FIG. 3, RF (radio frequency) drivers 341, 342, 343, 351, 352, 353 produce an AC electrical signal that drives oscillation of the lithium niobate crystal in MZ modulators 321, 322, 324, 331, 332, 334, respectively.

In FIG. 3, a DC (direct current) bias is applied to each MZ modulator via an electrical conductor (e.g., 361, 362, 363, 371, 372, 373). The DC bias for a given MZ modulator may be applied to set, or to dynamically adjust, the MZ modulator's operating point or quadrature point.

In some cases, a low-pass filter is employed to extract the downshifted signal. For instance, in some cases in FIG. 3: (a) multiple beat tones, including the downshifted signal, are produced by downshift cascade 311; and (b) a low-pass filter is applied to select, from these multiple beat tones, the downshifted signal. Likewise, in some cases in FIG. 2A: (a) multiple beat tones, including the downshifted signal, are produced by MZ modulator 207; and (b) a low-pass filter is applied to select, from these multiple beat tones, the downshifted signal. The lowpass filter may digital or analog. The low-pass filter may allow the downshifted signal to pass and may block signals at higher frequencies.

Alternatively or in addition, a photosensor with a low bandwidth may be employed. The low bandwidth may cause the photosensor to detect the downshifted signal but not detect other signals (such as higher frequency beat tones).

In FIGS. 2A and 3, one or more computers (e.g., 210 or 319) may interface with, control, or receive data from the photodetector (e.g., 209 or 315) or the laser (e.g., 301 or 206). In some cases, the one or more computers comprise a microcontroller or a PC (personal computer).

In some implementations, the illumination probe (the highest frequency beat tone illuminating the scene) creates a time-varying illumination pattern that has a non-sinusoidal component. This non-sinusoidal component may vary non-sinusoidally as a function of time. For instance, this non-sinusoidal component may comprise a summation of Bessel functions.

In some cases, the number of MZ modulators in the upshift cascade is equal to the number of MZ modulators in the downshift cascade. In some cases, all of the MZ modulators are operated at their maximum modulation frequency. In some cases, all of the MZ modulators have the same modulation frequency, except that one or more of the MZ modulators has a different modulation frequency that differs by less than 99 Hz from modulation frequencies for the other MZ modulators.

In some cases, there is a tradeoff between: (a) reducing the number of MZ modulators (in order to reduce the total insertion loss associated with the MZ modulators); and (b) increasing the number of MZ modulators (in order to increase the frequency of the illumination probe and thus to increase the accuracy of depth measurements).

The following three paragraphs describe an example of how beat tones may be created in an upshift cascade with three MZ modulators.

In this example, the first MZ modulator has a crystal that oscillates with a frequency of $\Omega_1$. In the first MZ modulator, light exits an arm of the interferometer (with the crystal) at modulation frequency $\Omega_1$.

In this example, the second MZ modulator has a crystal that oscillates with a frequency of $\Omega_2$. An input to the second MZ modulator is light with a modulation frequency of $\Omega_1$. Interference between light exiting the two arms of the second MZ modulator causes two beat tones, where one beat tone has a modulation frequency of $\Omega_1+\Omega_2$ and the other beat tone has a modulation frequency of $\Omega_1-\Omega_2$.

In this example, the third MZ modulator has a crystal that oscillates with a frequency of $\Omega_3$. Inputs to the third MZ modulator include: (a) light with a beat tone of $\Omega_1+\Omega_2$; and (b) light with a beat tone of $\Omega_1-\Omega_2$. Interference between light exiting the two arms of the third MZ modulator causes four beat tones, where: (a) a first beat tone is $\Omega_1+\Omega_2+\Omega_3$; (b) a second beat tone is $\Omega_1+\Omega_2-\Omega_3$; (c) a third beat tone is $\Omega_1-\Omega_2+\Omega_3$ and (d) a fourth beat tone is $\Omega_1-\Omega_2-\Omega_3$.

The example described in the preceding three paragraphs is non-limiting. This invention may be implemented in many other ways.

In some alternative implementations, each MZ modulator in FIGS. 2A and 3 is replaced by another type of optical modulator. For instance, in some alternative implementations, each optical modulator includes a Michelson, Fizau, Twyman-Green or Sagnac interferometer, instead of a Mach-Zehnder interferometer. Likewise, in some alternative implementations, each optical modulator includes (instead of a lithium niobate crystal) a different type of electro-optic modulator, such as a Pockels cell, LCD panel or polarized EO modulator. Furthermore, each heterodyne modulator described in FIGS. 2B and 4 may comprise a Mach-Zehnder modulator (including an MZ interferometer and a lithium niobate crystal) or may instead comprise any alternative type of optical modulator (e.g., any alternative described in this paragraph).

Figure 4:
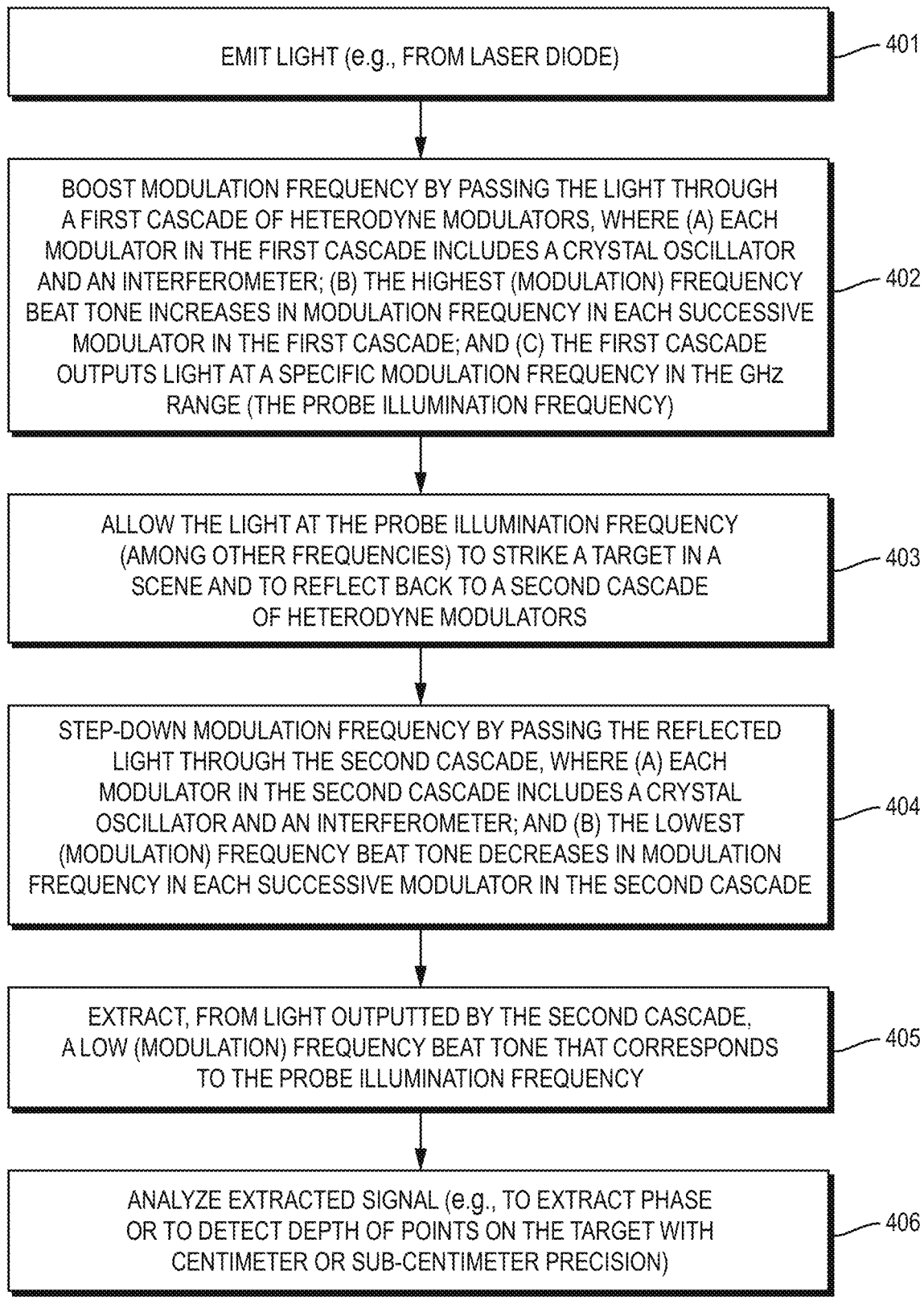
FIG. 4 is a flowchart for a cascaded ToF method of depth detection.

FIG. 4 is a flowchart for a cascaded ToF method of depth detection. In the example shown in FIG. 4, the example includes at least the following steps: Emit light (e.g., from laser diode) (Step 401). Boost modulation frequency by passing the light through a first cascade of heterodyne modulators, where (a) each modulator in the first cascade includes a crystal oscillator and an interferometer; (b) the highest (modulation) frequency beat tone increases in modulation frequency in each successive modulator in the first cascade; and (c) the first cascade outputs light at a specific modulation frequency in the GHz band (the probe illumination frequency) (Step 402). Allow the light at the probe illumination frequency (among other frequencies) to strike a target in a scene and to reflect back to a second cascade of heterodyne modulators (Step 403). Step-down modulation frequency by passing the reflected light through the second cascade, where (a) each modulator in the second cascade includes a crystal oscillator and an interferometer; and (b) the lowest (modulation) frequency beat tone decreases in modulation frequency in each successive modulator in the second cascade (Step 404). Extract, from light outputted by the second cascade, a low (modulation) frequency beat tone that corresponds to the probe illumination frequency (Step 405). Analyze extracted signal (e.g., to extract phase or to detect depth of points on the target with centimeter or sub-centimeter precision) (Step 406).

Phase and Depth

In illustrative implementations, phase or depth are extracted from a low-frequency beat tone. For instance, the low-frequency beat tone: (a) may be outputted by the second MZ modulator in a "two-modulator" configuration (FIG. 2A); or (b) may comprise the downshifted signal outputted by a downshift cascade in a "cascaded ToF" configuration (FIG. 3).

In some implementations, the depth of an object in the scene (a range target) is estimated, based on phase of the downshifted signal. The estimated depth may be the distance between the ToF imager and the range target. Alternatively, the roundtrip pathlength (which is twice the depth) may be determined from phase of the downshifted signal.

In some cases, phase may be converted to a range measurement using the relation $$\widehat{z_{ToF}} = \frac{c}{\Omega}\varphi,$$

where $\varphi$ is the phase and where $\widehat{z_{ToF}}$ is estimated pathlength (e.g., the round-trip distance from the ToF imager to the range target and back to the ToF imager). Thus, pathlength $z_{ToF}$ may be twice the distance between the ToF imager and the range target).

In some cases, phase of the downshifted signal is extracted by employing a standard ToF correlation approach. For instance, the ToF imager may include a sensor that comprises one or more lock-in pixels. Each lock-in pixel may measure a correlation between a reference signal and the downshifted signal incident at that pixel. Based on the correlation, the phase of the downshifted signal at that pixel may be determined. In some cases, the so-called "four-bucket" sampling method may be employed to calculate phase and pathlength for a given lock-in pixel, based on correlation measured by the lock-in pixel. In this "four bucket" sampling method, an estimated pathlength $\widehat{z_{ToF}}$ may be computed as follows:

$$\widehat{z_{ToF}} = \frac{c}{\Omega}\arctan\left(\frac{c\left(\frac{3\pi}{2}\right) - c\left(\frac{\pi}{2}\right)}{c(0) - c(\pi)}\right). \quad (4)$$

where c is the speed of light and c( ) is a correlation function.

Alternatively, the downshifted signal may be directly sampled (instead of measuring correlation with a reference signal) and phase may be extracted from the samples. In some cases, a 3-point DFT (discrete Fourier transform), or a n-point DFT, or non-linear curvefitting, may be employed to detect phase. In some cases, phase is calculated by a method that includes identifying zero crossings. In some implementations, direct sampling of the downshifted signal is facilitated by the low frequency of the downshifted signal (e.g., less than 30 Hz, or less than 20 Hz, or less than 10 Hz).

Phase Unwrapping

Detection of distance based on phase may suffer from a problem that is loosely called "phrase wrapping"—specifically, phase repeats itself every $2\pi$ radians. Thus, unless corrective steps are taken, the fact that phase "wraps" every $2\pi$ radians creates an ambiguity in distance measurements. For instance, in some situations, unless corrective steps are taken: (a) measurements of reflected light from a set of points at different depths have the same phase, due to the fact that $\varphi+2\pi n=\varphi$, where n is an integer; (b) distance is calculated based on phase; and (c) the different points have the same calculated depth, even though they are actually at different depths.

As modulation frequency increases, the problem of "phase wrapping" may become worse. Consider a concrete example where a phase ToF camera is operating at frequency $\Omega$. Then, scene objects at a pathlength greater than $$z_{ambiguity} = \frac{2c\pi}{\Omega} \quad (5)$$

may experience phase wrapping.

To mitigate phase wrapping, data may be acquired at frequency $\Omega$ and also separately acquired at a nearby frequency $\Omega^*$, defined such that $|\Omega^*-\Omega| \ll \Omega$ and $|\Omega^*-\Omega| \ll \Omega^*$. If this is done, only scene depths at a depth greater than $$z_{ambiguity} = \frac{2c\pi}{\|\Omega - \Omega^*\|}, \quad (6)$$

experience ambiguities at both $\Omega$ and $\Omega^*$.

In some implementations, phase unwrapping is performed. The phase unwrapping may mitigate or eliminate ambiguities that would otherwise arise due to phase wrapping.

In some cases, in order to mitigate phase wrapping, the range target is illuminated with two high-frequency signals that are near to each other. For instance, in some cases: (a) the range target is illuminated with two different high-frequency signals, one at a modulation frequency of $\Omega_H^{(1)}$ and the other at a modulation frequency of $\Omega_H^{(2)}$; (b) $|0.01(\Omega_H^{(1)}-1\Omega_H^{(2)})|$ is greater than or equal to $|\Omega_H^{(1)}|$ and is also greater than or equal to $|\Omega_H^{(2)}|$; and (c) thus, an ambiguity due to phase wrapping occurs at both frequencies $\Omega_H^{(1)}$ and $\Omega_H^{(2)}$ only for scene depths that are at a depth greater than $$\frac{2c\pi}{(\Omega_H^{(1)} - 1\Omega_H^{(2)})},$$

where c is the speed of light and $\pi$ is Archimedes' constant.

In some cases, the two high-frequency signals ($\Omega_H^{(1)}$, $\Omega_H^{(2)}$) described in the preceding paragraph are each in the GHz band. In some cases, the two high-frequency signals ($\Omega_H^{(1)}$, $\Omega_H^{(2)}$) described in the preceding paragraph are each outputted by the first MZ modulator 208 in FIG. 2A. In some cases, the two high-frequency signals ($\Omega_H^{(1)}$, $\Omega_H^{(2)}$) described in the preceding paragraph are each an illumination probe outputted by upshift cascade 303 in FIG. 3. In some cases, the two high-frequency signals ($\Omega_H^{(1)}$, $\Omega_H^{(2)}$) described in the preceding paragraph illuminate a static (non-moving) range target sequentially in time, one after the other. In some cases: (a) the two high-frequency signals ($\Omega_H^{(1)}$, $\Omega_H^{(2)}$) described in the preceding paragraph illuminate a range target simultaneously; (b) a cascaded ToF configuration is employed; and (c) the upshift and downshift cascades for signal $\Omega_H^{(1)}$ are separate from the upshift and downshift cascades for signal $\Omega_H^{(2)}$. In some cases: (a) the two high-frequency signals ($\Omega_H^{(1)}$, $\Omega_H^{(2)}$) described in the preceding paragraph illuminate a range target simultaneously; (b) a hardware configuration is employed that uses a total of only two modulators to illuminate a scene with a given GHz signal and then to create a low-frequency beat tone from that given GHZ signal; and (c) the two modulators employed for signal $\Omega_H^{(1)}$ are separate from the two modulators employed for signal $\Omega_H^{(2)}$.

In some cases, the two high-frequency signals ($\Omega_H^{(1)}$, $\Omega_H^{(2)}$) described in the preceding two paragraphs are selected by "tuning" modulation frequency of one or more MZ modulators (e.g., 208, 321, 322, 324). For instance, the modulation frequency of an MZ modulator may be "tuned" by changing the frequency of an AC electrical signal that drives oscillation of a lithium niobate crystal in the modulator.

Alternatively, other phase unwrapping methods may be employed, such as spatial phase unwrapping or machine learning-based phase unwrapping.

Mathematical Description—"Two Modulator" Approach

The following 13 paragraphs describe, in mathematical terms, a "two-modulator" approach.

Consider a case where one modulator is placed in series with another demodulator. As shown in FIG. 2A, the field from a continuous-wave laser may propagate through a Mach-Zehnder modulator (denoted as $MZ\Omega_1$) that comprises a Mach-Zehnder interferometer with a crystal in one arm. The potential difference across the crystal may oscillate sinusoidally at a frequency of $\Omega_1$. This field may be emitted at a range target. Before impinging upon the photodetector, the reflected light may pass through another Mach-Zehnder modulator (denoted as $MZ\Omega_2$), where now $\Omega_2$ denotes the voltage oscillation. A photodetector may detect a beat frequency at $\Delta\Omega = \Omega_1 - \Omega_2$, which is demodulated in post-processing electronics.

The forward model for this process may be shown to generate an approximate beat note, subject to approximation error. First, let us write a monochromatic plane wave as $E(t,z) = E_0 e^{j(\omega t - kz)}$, where z is the direction of propagation, $E_0$ is the amplitude of the field, $\omega$ is the angular frequency of optical radiation and $$k = \frac{\omega}{c}$$

is the wavenumber. To simplify notation, assume that z changes only as a result of path travel to the object. The electric field emitted toward the target may pass through the first Mach-Zehnder interferometer, such that $$E_{emit}(t, z) = E_0 \left( e^{j(\omega t - kz)} e^{j(n_0 + \eta \cos(\Omega_1 t - \Omega_1 \frac{z}{c}))} + e^{j(\omega t - kz)} \right), \quad (7)$$

where $E_{emit}(t,z)$ denotes the field as emitted toward the target, $n_0$ denotes the index of refraction at zero voltage and $\eta$ is a constant of sensitivity of the crystal to voltage oscillations.

In the context of time-of-flight range imaging, one may be interested in three parameter values for z in Equation 7. These represent the Field emitted from imager $E_{emit}(t, z = z_{imager})$ \hfill (8)

Field incident on target $E_{emit}\left(t, z = z_{imager} + \frac{z_{ToF}}{2}\right)$ Field returning to imager $E_{reflected}(t, z = z_{imager})$ where $z_{imager}$ denotes the axial location of the emitted light and $z_{ToF}$ represents the total pathlength traveled from the transmitter to range target and back to receiver.

Put differently, in some cases, $z_{ToF}$ is a roundtrip distance, and $$\frac{z_{ToF}}{2}$$

is equal to the depth of the range target (i.e., is equal to the distance between the ToF imager and range target).

The field that returns to the imager may be understood in context of the emitted field as $$E_{reflected}(t, z = z_{imager}) = E_{emit}(t, z = z_{ToF}), \quad (9)$$

The field that returns to the imager may be expanded as $$E_{reflected}(t, z = z_{imager}) = E_0 \underbrace{e^{j(\omega t - \omega \frac{z_{ToF}}{c})}}_{\text{optical term}} \times \left( \underbrace{e^{jn_0} e^{j\eta \cos(\Omega_1 t - \Omega_1 \frac{z_{ToF}}{c})}}_{\text{modulation term}} + 1 \right) \quad (10)$$

From Equation 10, it is desirable to extract the pathlength $z_{ToF}$ which is encoded in the optical and modulation terms. The optical term is a sinusoid whose phase encodes the depth. Unfortunately, for macroscopic ranging, the phase term may lack meaning because the term is scaled by $\omega = 10^{15}$ Hz. Even air vibrations may cause an appreciable phase shift. Henceforth, we will not consider extracting $z_{ToF}$ from the optical term. Instead, we may recover $z_{ToF}$ from the modulation term where $z_{ToF}$ is scaled by $\Omega \approx 10^9$ Hz. Modulation frequency $\Omega$ may be an electronically controlled parameter that is tuned using signal generation to sweep a range from DC to GHz.

The modulation term may be non-sinusoidal (i.e. can be seen as a summation of Bessel functions) with GHz frequency harmonics, too fast for many photosensors. Therefore, this field may be passed through a separate Mach-Zehnder to demodulate the signal, shown in FIG. 2A as $MZ\Omega_2$. In some cases, the demodulation Mach-Zehnder ($MZ\Omega_2$) follows the same structure as the modulation Mach-Zehnder ($MZ\Omega_1$), except that the voltage signal is modulated at a frequency of $\Omega + \Delta\Omega$. The electric field at the output of $MZ\Omega_2$ may then take the form of $$E_{measurement}^{demod} = E_0 e^{j(\omega t - \omega \frac{z_{ToF}}{c})} \left( e^{j \cos(\Omega t - \Omega \frac{z_{ToF}}{c})} + 1 \right) \times (1 + e^{j(\cos((\Omega + \Delta\Omega)t))}) \quad (11)$$

Now, the field $E_{measurement}^{demod}$ may be measured by the photodetector and approximated as:

$$I(t) \approx 0.88 E_0^2 \cos\left( -\Delta\Omega t - \Omega \underbrace{\frac{z_{ToF}}{c}}_{\varphi} \right) \quad (12)$$

The phase $\varphi$ may be estimated by correlating the low-frequency beat tone with a known reference. As is standard in correlation ToF imaging, let $r(t) = \cos(\Delta\Omega t)$ denote the reference signal. The correlation may therefore be $$c(\tau) = \lim_{T' \to \infty} \frac{1}{T'} \int_{-T'/2}^{T'/2} I(t) r(t + \tau) dt \quad (13)$$

$$\approx 0.44 E_0^2 \cos\left( \Delta\Omega t + \Omega \frac{z_{ToF}}{c} \right)$$

The pathlength $z_{ToF}$ may be estimated by using the relation $$\tilde{z}_{ToF} = \frac{c}{\Omega} \arctan\left( \frac{c\left(\frac{3\pi}{2}\right) - c\left(\frac{\pi}{2}\right)}{c(0) - c(\pi)} \right) \quad (14)$$

where c is the speed of light, c( ) is the correlation function defined in Equation 13, $\pi$ is Archimedes' constant, and arctan $$\frac{\left(c\left(\frac{3\pi}{2}\right) - c\left(\frac{\pi}{2}\right)\right)}{c(0) - c(\pi)}$$

is phase.

Alternatively, the pathlength $z_{ToF}$ may be estimated by any one other approach for extracting phase from correlation.

The "two-modulator" approach shown in FIG. 2A may be described using the above mathematical terminology. In FIG. 2A, light is emitted from a laser, and passes through Mach-Zehnder modulator $MZ\Omega_1$, which encodes a modulation signal on the laser light in the context of frequency $\Omega_1$. In FIG. 2A, light reaches a target at a range of $$\frac{z_{ToF}}{2}$$

away from the imager. In FIG. 2A, the reflected field is passed through another Mach-Zehnder modulator $MZ\Omega_2$ with frequency context of $\Omega_2$. In FIG. 2A, $\Omega_1 \neq \Omega_2$ and thus a low-frequency beat note at $\Delta\Omega = \Omega_1 - \Omega_2$ is observed at the photodetector.

The preceding 13 paragraphs describe a non-limiting example of this invention. This invention may be mathematically modeled or implemented in many other ways.
Mathematical Description—Cascaded Time-of-Flight The following six paragraphs describe, in mathematical terms, a "cascaded ToF" approach.

The maximum modulation frequency for an individual modulator may be limited. This may be due to a limit on the frequency of voltage oscillations applied to the crystal. In practice this limit may be based on the stability and quality of the crystal, but the highest performing LiNbO3 crystals may support 100 GHz modulation on the upper end. Denote $\Omega_{crystal}$ as the maximum frequency at which the crystal can oscillate In some cases, the imaging architecture includes multiple modulators to boost modulation frequency and multiple modulators to "down-shift" modulation frequency. To illuminate the scene with a frequency higher than $\Omega_{crystal}$, we may exploit a high-frequency beat note.

FIG. 3 illustrates an example of stacked modulators. In FIG. 3, $\Omega_1^{(k)}$ is the modulation frequency of the k-th MZ modulator in the upshift cascade. The highest-frequency beat note may be of primary interest in the stacked configuration. The highest-frequency beat note may have a frequency of $$\Omega_1^{max} = \sum_{k=1}^{K} \Omega_1^{(k)}, \qquad (15)$$

where $\Omega_1^{max}$ represents the maximum modulation frequency of illumination emitted at the target.

A similar approach of stacking Mach-Zehnder interferometers may be used to demodulate the received signal, such that $$\Omega_2^{max} = \sum_{k=1}^{K} \Omega_2^{(k)} \qquad (16)$$

Since $\Omega_1^{max} > \Omega_{crystal}$, it is possible to achieve even higher frequency modulation. When using such a cascade, it may be desirable to employ the highest-frequency beat note to detect depth. However, multiple combinations of beat notes may be emitted at the target. Consider the case of K=3 modulators used to illuminate the scene. The beat tones may be $$\Omega_1^{stacked} \rightarrow \begin{Bmatrix} \Omega_1^{(1)} + \Omega_1^{(2)} + \Omega_1^{(3)} \\ \Omega_1^{(1)} + \Omega_1^{(2)} - \Omega_1^{(3)} \\ \Omega_1^{(1)} - \Omega_1^{(2)} + \Omega_1^{(3)} \\ \Omega_1^{(1)} - \Omega_1^{(2)} - \Omega_1^{(3)} \end{Bmatrix}, \qquad (17)$$

where the highest frequency, $\Omega_1^{(1)} + \Omega_1^{(2)} + \Omega_1^{(3)}$, would be of primary interest for depth detection.

To recover the highest frequency, the appropriate demodulation frequencies and narrowband detection may be employed to sense only the low-frequency beat note corresponding to the illumination frequency of interest.

The preceding six paragraphs describe a non-limiting example of this invention. This invention may be mathematically modeled or implemented in many other ways.
More Details In illustrative implementations, the ToF imager is robust to vibrations because each pair of interferometric paths in the circuit are perturbed equally by a vibration (a form of common-mode rejection). In comparison, conventional interferometry can be affected by vibrations that perturb interferometric paths differently.

In illustrative implementations, a beat note is generated through electronic modulation. The Mach-Zehnder modulator may be a robust silicon photonic device that has been constructed for telecommunications applications. As such, a beat note generated by two or more MZ interferometers tends to be stable (to not drift in frequency). For instance, in some use scenarios: (a) the mean frequency of the beat signal is 30 Hz; and (b) the variance in frequency of the beat signal is less than 1 Hz. In some cases, a frequency band near 30 Hz makes this invention well-suited for taking time-of-flight measurements with a video camera.

In illustrative implementations, for a given MZ modulator, the coherence length of the laser light is greater than the path difference between the first and second arms of the modulator.

In some implementations, a video framerate photodetector may be used perform time-of-flight measurements.

In some implementations, this invention may be employed to improve spatial resolution when imaging hidden objects around corners using a correlation ToF imagers In some cases, the spatial resolution at which an image of a non-line-of-sight scene (e.g. around corners) may be recovered is:

$$\text{Seeing around corner resolution} \approx \frac{2\pi c C_1}{2\pi + C_1 C_2 \Omega} \qquad (18)$$

where $C_1$ and $C_2$ represent constants for the reflectance and size of the visible scene. For instance, for the same scene, a 30 MHz ToF imager may spatially resolve the occluded scene to 1 meter (a very blurry image), while a 100 GHz imager may resolve the same scene to one centimeter resolution.

Each cascade of modulators (e.g., 303, 311) that is described herein may comprise modulators that are arranged in series. Each cascade of modulators (e.g., 303, 311) that is described herein may be configured in such a way that, when light passes through the cascade, the light passes through the modulators sequentially, one modulator at a time. Each cascade of modulators (e.g., 303, 311) that is described herein may be configured in such a way that, if a pulse of light were to pass through the cascade, the pulse would pass through the modulators sequentially, one modulator at a time. A cascade may satisfy the preceding sentence, even if pulsed light is never used in operation of the cascade, as long as the preceding sentence would be true if pulsed light were used.

Computers

In illustrative implementations of this invention, one or more computers (e.g., servers, network hosts, client computers, integrated circuits, microcontrollers, controllers, field-programmable-gate arrays, personal computers, digital computers, driver circuits, or analog computers) are programmed or specially adapted to perform one or more of the following tasks: (1) to control the operation of, or interface with, hardware components of an imaging system, including a light source (e.g., laser), photosensor, or electro-optic light modulator; (2) to extract phase or depth from a low-frequency beat tone detected by a photosensor; (3) to receive data from, control, or interface with one or more sensors; (4) to perform any other calculation, computation, program, algorithm, or computer function described or implied herein; (5) to receive signals indicative of human input; (6) to output signals for controlling transducers for outputting information in human perceivable format; (7) to process data, to perform computations, and to execute any algorithm or software; and (8) to control the read or write of data to and from memory devices (tasks 1-8 of this sentence referred to herein as the "Computer Tasks"). The one or more computers (e.g. 210, 319) may, in some cases, communicate with each other or with other devices: (a) wirelessly, (b) by wired connection, (c) by fiber-optic link, or (d) by a combination of wired, wireless or fiber optic links.

In exemplary implementations, one or more computers are programmed to perform any and all calculations, computations, programs, algorithms, computer functions and computer tasks described or implied herein. For example, in some cases: (a) a machine-accessible medium has instructions encoded thereon that specify steps in a software program; and (b) the computer accesses the instructions encoded on the machine-accessible medium, in order to determine steps to execute in the program. In exemplary implementations, the machine-accessible medium may comprise a tangible non-transitory medium. In some cases, the machine-accessible medium comprises (a) a memory unit or (b) an auxiliary memory storage device. For example, in some cases, a control unit in a computer fetches the instructions from memory.

In illustrative implementations, one or more computers execute programs according to instructions encoded in one or more tangible, non-transitory, computer-readable media. For example, in some cases, these instructions comprise instructions for a computer to perform any calculation, computation, program, algorithm, or computer function described or implied herein. For example, in some cases, instructions encoded in a tangible, non-transitory, computer-accessible medium comprise instructions for a computer to perform the Computer Tasks.

Network Communication

In illustrative implementations of this invention, electronic devices (e.g. 206, 209, 210, 301, 315, 319) are each configured for wireless or wired communication with other devices in a network.

For example, in some cases, one or more of these electronic devices each include a wireless module for wireless communication with other devices in a network. Each wireless module may include (a) one or more antennas, (b) one or more wireless transceivers, transmitters or receivers, and (c) signal processing circuitry. Each wireless module may receive and transmit data in accordance with one or more wireless standards.

In some cases, one or more of the following hardware components are used for network communication: a computer bus, a computer port, network connection, network interface device, host adapter, wireless module, wireless card, signal processor, modem, router, cables or wiring.

In some cases, one or more computers (e.g. 210, 319) are programmed for communication over a network. For example, in some cases, one or more computers are programmed for network communication: (a) in accordance with the Internet Protocol Suite, or (b) in accordance with any other industry standard for communication, including any USB standard, ethernet standard (e.g., IEEE 802.3), token ring standard (e.g., IEEE 802.5), wireless standard (including IEEE 802.11 (wi-fi), IEEE 802.15 (bluetooth/zigbee), IEEE 802.16, IEEE 802.20 and including any mobile phone standard, including GSM (global system for mobile communications), UMTS (universal mobile telecommunication system), CDMA (code division multiple access, including IS-95, IS-2000, and WCDMA), or LTE (long term evolution)), or other IEEE communication standard.

Definitions

The terms "a" and "an", when modifying a noun, do not imply that only one of the noun exists. For example, a statement that "an apple is hanging from a branch": (i) does not imply that only one apple is hanging from the branch; (ii) is true if one apple is hanging from the branch; and (iii) is true if multiple apples are hanging from the branch.

"AC" means alternating current.

"Archimedes' constant" means the ratio of a circle's circumference to its diameter. Archimedes' constant is sometimes called "pi" or "π". Archimedes' constant is an irrational number that is approximately equal to 3.14159.

To compute "based on" specified data means to perform a computation that takes the specified data as an input.

Non-limiting examples of a "camera" include: (a) a digital camera; (b) a digital grayscale camera; (c) a digital color camera; (d) a video camera; (e) a light sensor, imaging sensor, or photodetector; (f) a set or array of light sensors, imaging sensors or photodetectors; (g) an imaging system; (h) a light field camera or plenoptic camera; (i) a time-of-flight camera; and (j) a depth camera. In some cases, a camera includes any computers or circuits that process data captured by the camera.

To say that X "causes" Y means that X is a cause of Y.

The term "comprise" (and grammatical variations thereof) shall be construed as if followed by "without limitation". If A comprises B, then A includes B and may include other things.

The term "computer" means a computational device that is configured to perform logical and arithmetic operations. For example, in some cases, a "computer" comprises an electronic computational device, such as an integrated circuit, a microprocessor, a mobile computing device, a laptop computer, a tablet computer, a personal computer, or a mainframe computer. In some cases, a "computer" comprises: (a) a central processing unit, (b) an ALU (arithmetic logic unit), (c) a memory unit, and (d) a control unit that controls actions of other components of the computer in such a way that encoded steps of a program are executed in a sequence. In some cases, a "computer" also includes peripheral units including an auxiliary memory storage device (e.g., a disk drive or flash memory), or includes signal processing circuitry. However, a human is not a "computer", as that term is used herein.

"Defined Term" means a term or phrase that is set forth in quotation marks in this Definitions section.

"Downshifted signal" is defined above.

For an event to occur "during" a time period, it is not necessary that the event occur throughout the entire time period. For example, an event that occurs during only a portion of a given time period occurs "during" the given time period.

The term "e.g." means for example.

Non-limiting examples of an "equation", as that term is used herein, include: (a) an equation that states an equality; (b) an inequation that states an inequality (e.g., that a first item is greater than or less than a second item); (c) a mathematical statement of proportionality or inverse proportionality; and (d) a system of equations.

The fact that an "example" or multiple examples of something are given does not imply that they are the only instances of that thing. An example (or a group of examples) is merely a non-exhaustive and non-limiting illustration.

Unless the context clearly indicates otherwise: (1) a phrase that includes "a first" thing and "a second" thing does not imply an order of the two things (or that there are only two of the things); and (2) such a phrase is simply a way of identifying the two things, respectively, so that they each may be referred to later with specificity (e.g., by referring to "the first" thing and "the second" thing later). For example, unless the context clearly indicates otherwise, if an equation has a first term and a second term, then the equation may (or may not) have more than two terms, and the first term may occur before or after the second term in the equation. A phrase that includes a "third" thing, a "fourth" thing and so on shall be construed in like manner.

"For instance" means for example.

Unless the context clearly indicates otherwise, each "frequency" that is described herein is a modulation frequency.

"GHz" means gigahertz.

"GHz band" means the band of frequencies that is greater than or equal to 1 GHz and less than or equal to 999 GHz.

"Hertz band" means the band of frequencies that is greater than or equal to 1 Hz and less than or equal to 99 Hz.

To say a "given" X is simply a way of identifying the X, such that the X may be referred to later with specificity. To say a "given" X does not create any implication regarding X. For example, to say a "given" X does not create any implication that X is a gift, assumption, or known fact.

"Herein" means in this document, including text, specification, claims, abstract, and drawings.

"Illumination probe" is defined above.

As used herein: (1) "implementation" means an implementation of this invention; (2) "embodiment" means an embodiment of this invention; (3) "case" means an implementation of this invention; and (4) "use scenario" means a use scenario of this invention.

The term "include" (and grammatical variations thereof) shall be construed as if followed by "without limitation".

To say that a beat tone or light signal is "in the gigahertz band" means that the beat tone or light signal has a modulation frequency in the gigahertz band.

To say that a beat tone or light signal is "in the hertz band" means that the beat tone or light signal has a modulation frequency in the hertz band.

"Light" means electromagnetic radiation of any frequency. For example, "light" includes, among other things, visible light and infrared light. Likewise, any term that directly or indirectly relates to light (e.g., "imaging") shall be construed broadly as applying to electromagnetic radiation of any frequency.

"MHz" means megahertz.

"MHz band" means the band of frequencies that is greater than or equal to 1 MHz and less than or equal to 999 MHz.

To say that a length is "micron-scale" or "micrometer-scale" means that the length is greater than or equal to 1 micron and less than or equal to 999 microns.

The term "or" is inclusive, not exclusive. For example, A or B is true if A is true, or B is true, or both A and B are true. Also, for example, a calculation of A or B means a calculation of A, or a calculation of B, or a calculation of A and B.

A parenthesis is simply to make text easier to read, by indicating a grouping of words. A parenthesis does not mean that the parenthetical material is optional or may be ignored.

"Pathlength" means distance traveled by light from start to end of a path.

As used herein, the term "set" does not include a group with no elements.

Unless the context clearly indicates otherwise, "some" means one or more.

As used herein, a "subset" of a set consists of less than all of the elements of the set.

The term "such as" means for example.

To say that a machine-readable medium is "transitory" means that the medium is a transitory signal, such as an electromagnetic wave.

Except to the extent that the context clearly requires otherwise, if steps in a method are described herein, then the method includes variations in which: (1) steps in the method occur in any order or sequence, including any order or sequence different than that described herein; (2) any step or steps in the method occur more than once; (3) any two steps occur the same number of times or a different number of times during the method; (4) any combination of steps in the method is done in parallel or serially; (5) any step in the method is performed iteratively; (6) a given step in the method is applied to the same thing each time that the given step occurs or is applied to different things each time that the given step occurs; (7) one or more steps occur simultaneously, or (8) the method includes other steps, in addition to the steps described herein.

Headings are included herein merely to facilitate a reader's navigation of this document. A heading for a section does not affect the meaning or scope of that section.

This Definitions section shall, in all cases, control over and override any other definition of the Defined Terms. The Applicant or Applicants are acting as his, her, its or their own lexicographer with respect to the Defined Terms. For example, the definitions of Defined Terms set forth in this Definitions section override common usage or any external dictionary. If a given term is explicitly or implicitly defined in this document, then that definition shall be controlling, and shall override any definition of the given term arising from any source (e.g., a dictionary or common usage) that is external to this document. If this document provides clarification regarding the meaning of a particular term, then that clarification shall, to the extent applicable, override any definition of the given term arising from any source (e.g., a dictionary or common usage) that is external to this document. Unless the context clearly indicates otherwise, any definition or clarification herein of a term or phrase applies to any grammatical variation of the term or phrase, taking into account the difference in grammatical form. For example, the grammatical variations include noun, verb, participle, adjective, and possessive forms, and different declensions, and different tenses.

Variations

This invention may be implemented in many different ways. Here are some non-limiting examples:

In some implementations, this invention is a method comprising: (a) passing light through a first cascade of modulators, which first cascade comprises heterodyne modulators that each modulate the light at a modulation frequency; (b) outputting, from the first cascade of modulators, a first beat tone of light, which first beat tone has a modulation frequency that is in the gigahertz band and that is equal to the sum of the modulation frequencies of the heterodyne modulators in the first cascade; (c) illuminating an object with the first beat tone in the gigahertz band; (d) modulating reflected light from the object, by passing the reflected light through a second cascade of modulators, which second cascade comprises heterodyne modulators that each modulate the reflected light at a modulation frequency; (e) outputting, from the second cascade, a second beat tone of light, which second beat tone has a modulation frequency that is in the hertz band and that is equal to the modulation frequency of the first beat tone minus the sum of the modulation frequencies of the heterodyne modulators in the second cascade; (f) detecting the second beat tone, which second beat tone is in the hertz band; and (g) based on the second beat tone, estimating (A) depth of the object or (B) a pathlength of light to and from the object. In some cases, each modulator in the first and second cascades comprises a Mach-Zehnder interferometer and a lithium niobate crystal that is located in an arm of the interferometer. In some cases, each modulator in the first and second cascades comprises: (a) an interferometer; and (b) an electro-optic modulator that modulates light in an arm of the interferometer. In some cases: (a) the method further comprises calculating a correlation of the second beat tone and a reference signal; and (b) the estimating comprises estimating based on the correlation. In some cases, the modulation frequencies at which the heterodyne modulators in the first and second cascades modulate light are each in the gigahertz range. In some cases: (a) the modulation frequency of the first beat tone is greater than or equal to 100 gigahertz; and (b) the modulation frequency of the second beat tone is less than or equal to 30 hertz. Each of the cases described above in this paragraph is an example of the method described in the first sentence of this paragraph, and is also an example of an embodiment of this invention that may be combined with other embodiments of this invention.

In some implementations, this invention is a method comprising: (a) passing light through a first heterodyne modulator that modulates the light at a first modulation frequency in the gigahertz band; (b) outputting, from the first modulator, a modulated light signal in the gigahertz band; (c) illuminating an object with the modulated light signal in the gigahertz band; (d) modulating reflected light from the object, by passing the reflected light through a second heterodyne modulator that modulates the reflected light at a second modulation frequency; (e) outputting, from the second heterodyne modulator, a beat tone of light, which beat tone has a modulation frequency that is in the hertz band and that is equal to the magnitude of the first modulation frequency minus the second modulation frequency; (f) detecting the beat tone, which beat tone is in the hertz band; and (g) based on the beat tone, estimating (A) depth of the object or (B) pathlength of light to and from the object. In some cases, the first and second modulators each comprise a Mach-Zehnder interferometer and a lithium niobate crystal that is located in an arm of the interferometer. In some cases, the first and second modulators each comprise: (a) an interferometer; and (b) an electro-optic modulator that modulates light in an arm of the interferometer. In some cases: (a) the method further comprises calculating a correlation of the second beat tone and a reference signal; and (b) the estimating comprises estimating based on the correlation. In some cases, the modulation frequencies at which the first and second modulators modulate light are each in the gigahertz range. In some cases: (a) the modulated signal has a modulation frequency that is greater than or equal to 1 gigahertz and less than or equal to 100 gigahertz; and (b) the modulation frequency of the beat tone is less than or equal to 30 hertz. Each of the cases described above in this paragraph is an example of the method described in the first sentence of this paragraph, and is also an example of an embodiment of this invention that may be combined with other embodiments of this invention.

In some implementations, this invention is a system comprising: (a) a light source; (b) a first cascade of heterodyne modulators; (c) a second cascade of heterodyne modulators; (d) a photodetector; and (e) one or more computers; wherein (i) each heterodyne modulator in the first and second cascades is configured to modulate light at a modulation frequency, (ii) the first cascade is configured to output a first beat tone of light that has a modulation frequency in the gigahertz range and that illuminates an object, (iii) the second cascade is configured to modulate reflected light from the object and to output a second beat tone of light, which second beat tone has a modulation frequency that is in the hertz band and that is equal to the modulation frequency of the first beat tone minus the sum of the modulation frequencies of the heterodyne modulators in the second cascade, (iv) the photodetector is configured to detect the second beat tone, which second beat tone is in the hertz band, and (v) the one or more computers are programmed to compute, based on the second beat tone, (A) depth of the object or (B) a pathlength of light to and from the object. In some cases, each modulator in the first and second cascades comprises a Mach-Zehnder interferometer and a lithium niobate crystal that is located in an arm of the interferometer. In some cases, each modulator in the first and second cascades comprises: (a) an interferometer; and (b) an electro-optic modulator that is configured to modulate light in an arm of the interferometer. In some cases: (a) the photodetector is configured to measure a correlation of the second beat tone and a reference signal; and (b) the one or more computers are programmed to take the correlation as an input when computing the depth or pathlength. In some cases, the modulation frequencies at which the heterodyne modulators in the first and second cascades modulate light are each in the gigahertz range. In some cases: (a) the modulation frequency of the first beat tone is greater than or equal to 100 gigahertz; and (b) the modulation frequency of the second beat tone is less than or equal to 30 hertz. In some cases: (a) the first cascade comprises two heterodyne modulators and does not include any other heterodyne modulators; and (b) the second cascade comprises two heterodyne modulators and does not include any other heterodyne modulators. In some cases: (a) the first cascade comprises three heterodyne modulators and does not include any other heterodyne modulators; and (b) the second cascade comprises three heterodyne modulators and does not include any other heterodyne modulators. Each of the cases described above in this paragraph is an example of the system described in the first sentence of this paragraph, and is also an example of an embodiment of this invention that may be combined with other embodiments of this invention.

Each description herein (or in the Provisional) of any method, apparatus or system of this invention describes a non-limiting example of this invention. This invention is not limited to those examples, and may be implemented in other ways.

Each description herein (or in the Provisional) of any prototype of this invention describes a non-limiting example of this invention. This invention is not limited to those examples, and may be implemented in other ways.

Each description herein (or in the Provisional) of any implementation, embodiment or case of this invention (or any use scenario for this invention) describes a non-limiting example of this invention. This invention is not limited to those examples, and may be implemented in other ways.

Each Figure herein (or in the Provisional) that illustrates any feature of this invention shows a non-limiting example of this invention. This invention is not limited to those examples, and may be implemented in other ways.

The above description (including without limitation any attached drawings and figures) describes illustrative implementations of the invention. However, the invention may be implemented in other ways. The methods and apparatus which are described herein are merely illustrative applications of the principles of the invention. Other arrangements, methods, modifications, and substitutions by one of ordinary skill in the art are also within the scope of the present invention. Numerous modifications may be made by those skilled in the art without departing from the scope of the invention. Also, this invention includes without limitation each combination and permutation of one or more of the items (including hardware, hardware components, methods, processes, steps, software, algorithms, features, or technology) that are described herein.

What is claimed:

1. A method comprising:
   (a) passing light through a first cascade of modulators, which first cascade comprises heterodyne modulators that each modulate the light at a modulation frequency;
   (b) outputting, from the first cascade of modulators, a first beat tone of light, which first beat tone has a modulation frequency that is in the gigahertz band and that is equal to the sum of the modulation frequencies of the heterodyne modulators in the first cascade;
   (c) illuminating an object with the first beat tone in the gigahertz band;
   (d) modulating reflected light from the object, by passing the reflected light through a second cascade of modulators, which second cascade comprises heterodyne modulators that each modulate the reflected light at a modulation frequency;
   (e) outputting, from the second cascade, a second beat tone of light, which second beat tone has a modulation frequency that is in the hertz band and that is equal to the modulation frequency of the first beat tone minus the sum of the modulation frequencies of the heterodyne modulators in the second cascade;
   (f) detecting the second beat tone, which second beat tone is in the hertz band; and
   (g) based on the second beat tone, estimating (A) depth of the object or (B) a pathlength of light to and from the object.

2. The method of claim 1, wherein each modulator in the first and second cascades comprises a Mach-Zehnder interferometer and a lithium niobate crystal that is located in an arm of the interferometer.

3. The method of claim 1, wherein each modulator in the first and second cascades comprises:
   (a) an interferometer; and
   (b) an electro-optic modulator that modulates light in an arm of the interferometer.

4. The method of claim 1, wherein:
   (a) the method further comprises calculating a correlation of the second beat tone and a reference signal; and
   (b) the estimating comprises estimating based on the correlation.

5. The method of claim 1, wherein the modulation frequencies at which the heterodyne modulators in the first and second cascades modulate light are each in the gigahertz range.

6. The method of claim 1, wherein:
   (a) the modulation frequency of the first beat tone is greater than or equal to 100 gigahertz; and
   (b) the modulation frequency of the second beat tone is less than or equal to 30 hertz.

7. A method comprising:
   (a) passing light through a first heterodyne modulator that modulates the light at a first modulation frequency in the gigahertz band;
   (b) outputting, from the first modulator, a modulated light signal in the gigahertz band;
   (c) illuminating an object with the modulated light signal in the gigahertz band;
   (d) modulating reflected light from the object, by passing the reflected light through a second heterodyne modulator that modulates the reflected light at a second modulation frequency;
   (e) outputting, from the second heterodyne modulator, a beat tone of light, which beat tone has a modulation frequency that is in the hertz band and that is equal to the magnitude of the first modulation frequency minus the second modulation frequency;
   (f) detecting the beat tone, which beat tone is in the hertz band; and
   (g) based on the beat tone, estimating (A) depth of the object or (B) pathlength of light to and from the object.

8. The method of claim 7, wherein the first and second modulators each comprise a Mach-Zehnder interferometer and a lithium niobate crystal that is located in an arm of the interferometer.

9. The method of claim 7, wherein the first and second modulators each comprise:
   (a) an interferometer; and
   (b) an electro-optic modulator that modulates light in an arm of the interferometer.

10. The method of claim 7, wherein:
    (a) the method further comprises calculating a correlation of the second beat tone and a reference signal; and
    (b) the estimating comprises estimating based on the correlation.

11. The method of claim 7, wherein the modulation frequencies at which the first and second modulators modulate light are each in the gigahertz range.

12. The method of claim 7, wherein:
(a) the modulated signal has a modulation frequency that is greater than or equal to 1 gigahertz and less than or equal to 100 gigahertz; and
(b) the modulation frequency of the beat tone is less than or equal to 30 hertz.

13. A system comprising:
(a) a light source;
(b) a first cascade of heterodyne modulators;
(c) a second cascade of heterodyne modulators;
(d) a photodetector; and
(e) one or more computers;
wherein
(i) each heterodyne modulator in the first and second cascades is configured to modulate light at a modulation frequency,
(ii) the first cascade is configured to output a first beat tone of light that has a modulation frequency in the gigahertz range and that illuminates an object,
(iii) the second cascade is configured to modulate reflected light from the object and to output a second beat tone of light, which second beat tone has a modulation frequency that is in the hertz band and that is equal to the modulation frequency of the first beat tone minus the sum of the modulation frequencies of the heterodyne modulators in the second cascade,
(iv) the photodetector is configured to detect the second beat tone, which second beat tone is in the hertz band, and
(v) the one or more computers are programmed to compute, based on the second beat tone, (A) depth of the object or (B) a pathlength of light to and from the object.

14. The system of claim 13, wherein each modulator in the first and second cascades comprises a Mach-Zehnder interferometer and a lithium niobate crystal that is located in an arm of the interferometer.

15. The system of claim 13, wherein each modulator in the first and second cascades comprises:
(a) an interferometer; and
(b) an electro-optic modulator that is configured to modulate light in an arm of the interferometer.

16. The system of claim 13, wherein:
(a) the photodetector is configured to measure a correlation of the second beat tone and a reference signal; and
(b) the one or more computers are programmed to take the correlation as an input when computing the depth or pathlength.

17. The system of claim 13, wherein the modulation frequencies at which the heterodyne modulators in the first and second cascades modulate light are each in the gigahertz range.

18. The system of claim 13, wherein:
(a) the modulation frequency of the first beat tone is greater than or equal to 100 gigahertz; and
(b) the modulation frequency of the second beat tone is less than or equal to 30 hertz.

19. The system of claim 13, wherein:
(a) the first cascade comprises two heterodyne modulators and does not include any other heterodyne modulators; and
(b) the second cascade comprises two heterodyne modulators and does not include any other heterodyne modulators.

20. The system of claim 13, wherein:
(a) the first cascade comprises three heterodyne modulators and does not include any other heterodyne modulators; and
(b) the second cascade comprises three heterodyne modulators and does not include any other heterodyne modulators.

* * * * *